United States Patent Office 2,804,420
Patented Aug. 27, 1957

2,804,420

INSECT TOXICANT

Albert A. Danish and Rex E. Lidov, Denver, Colo., assignors to Shell Development Company, New York, N. Y., a corporation of Delaware No Drawing. Application August 30, 1954, Serial No. 453,117

5 Claims. (Cl. 167—30)

This invention pertains to a new polyhalogeno octahydro dimethanonaphthalene compound that has been found to have not only an unforeseen toxicity towards insects and similar pests, but also a highly desirable and unexpectedly low toxicity towards mammals. Pesticidal compositions of matter containing the new chemical compound of this invention and the control of insects and similar pests with the aid thereof form further aspects of the invention.

It is known that certain fused-ring polycyclic halogen-substituted hydrocarbons have valuable insecticidal properties. Perhaps one of the best known of the insecticides of this general chemical type is the chemical compound known as aldrin, which can also be identified by means of the chemical name 1,2,3,4,10,10-hexachloro-1,4,4a,5, 8,8a-hexahydro-1,4-endo,exo-5,8-dimethanonaphthalene.

The insecticidal activity of aldrin and closely related compounds has been found to depend not only upon the number, kind and position of substituents on the fused-ring polycyclic nucleus, but also upon the degree of saturation of the fused ring, polycyclic structure. For example, a compound of quite different toxic properties is obtained when the double bond in the 6,7 position of the aldrin molecule is saturated, as is brought out by a comparison of the test results shown in the Lidov patent—U. S. 2,635,979, compound of Example I, with the test results shown in the Lidov patent—U. S. 2,635,977, hexachlorotetracyclododecadiene (pure).

Heretofore, saturation of the olefinic bond in the 6,7 position of the aldrin molecule and substitution of chlorine into this resulting saturated ring has led to substantially complete detoxification. For example, the chemical compound 1,2,3,4,10,10 - cis - 6,7-octachloro-1,4,4a,5,6,7,8,8a-octahydro-1,4,5,8-dimethanonaphthalene (which can be prepared by reaction of cis-dichloroethylene with cyclopentadiene followed by Diels-Alder adduction of this product and hexachlorocyclopentadiene) has a toxicity index against the common housefly (*Musca domestica*) and compared to alpha-chlordane of essentially zero. The comparable toxicity index of aldrin is approximately 800. 1,2,3,4,10,10 - trans-6,7-octachloro-1,4,4a,5,6,7,8,8a-octahydro-1,4,5,8-dimethanonaphthalene (prepared similarly using trans-dichloroethylene instead of cis-dichloroethylene) has a toxicity index against the common housefly (*Musca domestica*) compared to alpha-chlordane of essentially zero.

Contrary to these indications that the octachloro octahydro dimethanonaphthalenes can be expected to have but low toxicity, there now has been discovered a particular octachloro octahydro dimethanonaphthalene that has a surprisingly high toxicity towards insects and related pests. Furthermore, this new compound has the distinct advantage of a surprisingly low mammalian toxicity. As a result of this combination of properties, the new toxicant of this invention can be employed safely under circumstances where the danger of poisoning humans and farm and other domestic animals would preclude the general use of many insecticides heretofore known.

This new octachloro octahydro dimethanonaphthalene is believed to be a position isomer of the specific octachloro octahydro dimethanonaphthalenes mentioned above. It is believed to have the structure indicated by the chemical name 1,2,3,4,6,9,10,10-octachloro-1,4,4a,5, 6,7,8,8a - octahydro - 1,4,5,8-dimethanonaphthalene. The structural formula represented by this chemical name can be represented as follows:

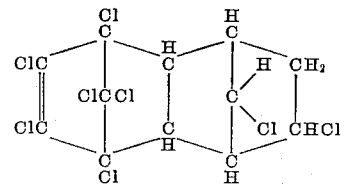

This new insect toxicant, and useful crude mixtures containing it have been prepared by chlorinating bicyclo(2.2.1)-2,5-heptadiene until about one mole of chlorine per mole of bicyclo(2.2.1)2,5-heptadiene has been absorbed, and then reacting an unsaturated dichloro derivative thus produced with hexachlorocyclopentadiene in a Diels-Alder type reaction. The essential chemical reactions can be represented as follows:

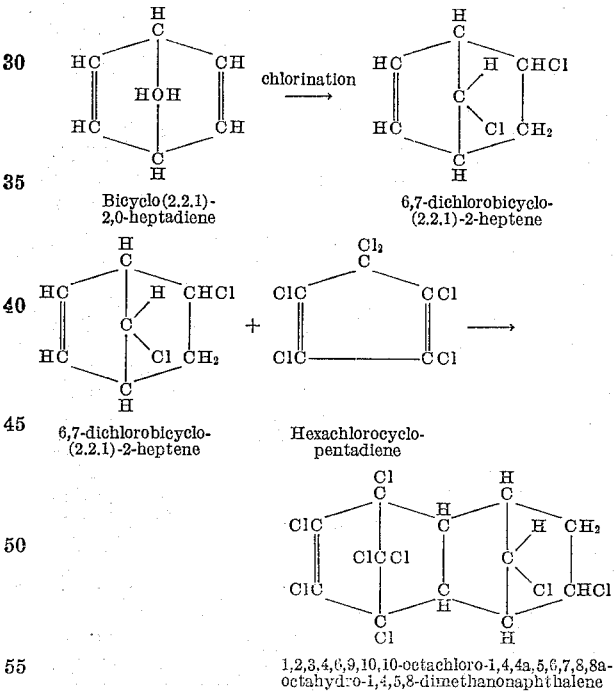

1,2,3,4,6,9,10,10-octachloro-1,4,4a,5,6,7,8,8a-octahydro-1,4,5,8-dimethanonaphthalene The chlorination of the bicyclo(2.2.1)-2,5-heptadiene can be carried out conveniently using elemental chlorine as the chlorinating agent. Other known chlorinating agents can be used, however, such as iodobenzene dichloride, sulfuryl chloride, and their equivalents.

When elemental chlorine is used as the chlorinating agent, the chlorination can be conducted with the bicyclo(2.2.1)-2,5-heptadiene in liquid phase and at temperatures within the range of from about −40° C. up to about 80° C., and by applying moderate superatmospheric pressures the liquid phase chlorination may be conducted at even somewhat higher temperatures, say up to 140° to 150° C. Vapor phase chlorination procedures may also be used, wherein chlorination temperatures as high as about 350° C., preferably between about 150° and about 250° C., are applicable.

The chlorination of bicyclo(2.2.1)-2,5-heptadiene in liquid phase may be carried out by running a stream of elemental chlorine into the liquid dienoic hydrocarbon, in the presence of an inert diluent or solvent if desired, such as a lower perhalocarbon, e. g., carbon tetrachloride, hexachloroethane, etc., or an aromatic hydrocarbon, e. g., benzene. Or there can be employed a modification of this procedure. For example, bicyclo(2.2.1)-2,5-heptadiene may be introduced either continuously or incrementally into an inert solvent previously saturated with elemental chlorine and additional amounts of chlorine added to the solution during the course of the reaction as may be required to effect the desired conversion of the bicyclo(2.2.1)-2,5-heptadiene.

In the vapor phase chlorination using elemental chlorine as the chlorinating agent, a continuous flow system advantageously may be employed. In the preferred procedure, gaseous streams of bicyclo(2.2.1)-2,5-heptadiene and preferably a slight excess of chlorine are combined and the mixture is passed through a tubular reactor maintained at the chlorination temperature.

In either case, the chlorination takes place readily in the absence of catalysts. If desired, the chlorination may be energized by conducting it under the influence of actinic light, or catalysts may be employed to facilitate the reaction. Suitable catalysts include acids in the generalized sense, that is, the strong Lewis acids, such as boron trifluoride, aluminum chloride, stannic chloride and other Friedel-Crafts catalysts, as well as the strong non-oxidizing mineral acids, such as sulfuric acid.

The chlorination of bicyclo(2.2.1)-2,5-heptadiene generally produces a mixture of $C_7$ chlorine-substituted compounds, some of which are saturated. For the reaction with hexachlorocyclopentadiene the 6,7-dichlorobicyclo-(2.2.1)-2-heptene may be separated in essentially pure state from the chlorination products or, preferably, there can be separated a fraction that is enriched in 6,7-dichlorobicyclo(2.2.1)-2-heptene compared to the crude chlorination product. Less desirably, the entire crude chlorination product can be employed for the adduction with hexachlorocyclopentadiene.

It is preferred to subject the crude products of the chlorination of the bicyclo(2.2.1)-2,5-heptadiene to fractional distillation and thereby separate from it a fraction comprising unsaturated $C_7$ dichlorides including 6,7-dichlorobicyclo(2.2.1)-2-heptene. A suitable fraction will distill within the range of from about 75° C. to about 110° C. under 15 millimeters mercury pressure, and preferably between about 85° C. and about 100° C. under 15 millimeters' mercury pressure. Other distillation pressures, of course, can be used, together with distillation temperatures that are correspondingly higher or lower as the case may be. It has been observed that the refractive index of the distillate provides a convenient indication of the content of 6,7-dichlorobicyclo(2.2.1)-2-heptene in the fraction; the fraction that is taken preferably should have a refractive index equal to or higher than $n\ 20/D=1.52$ to insure that the content of 6,7-dichlorobicyclo(2.2.1)-2-heptene is sufficiently high for the most efficient conversion to 1,2,3,4,6,9,10,10-octachloro-1,4,4a,5,6,7,8,8a-octahydro-1,4,5,8-dimethanonaphthalene upon reaction with hexachlorocyclopentadiene.

If it is desired to isolate substantially pure 6,7-dichlorobicyclo(2.2.1)-2-heptene from the chlorination products for use in the reaction with hexachlorocyclopentadiene, this can be done by careful and repeated fractional distillation. Under a mercury pressure of about 2.7 millimeters 6,7-dichlorobicyclo(2.2.1)-2-heptene distills at about 62° to 63° C.

The Diels-Alder adduction of hexachlorocyclopentadiene and the 6,7-dichlorobicyclo(2.2.1)-2-heptene occurs upon heating hexachlorocyclopentadiene with the 6,7-dichlorobicyclo(2.2.1)-2-heptene or reaction products or fractions of the same containing it, together in about 1:1 mole ratio at temperatures within the range of from about 100° C. up to about 250° C. In order to maintain the reactants in liquid phase, the reaction may be conducted under superatmospheric pressure if necessary, as in an autoclave. The reaction time can be varied in accordance with the reaction temperature. In general, reaction times of from about 8 hours up to about 250 hours are adequate. The novel adduct of this invention can be recovered from the resulting mixture by conventional methods used for isolation of high-boiling normally solid organic compounds. A suitable method has been found to be to dilute the crude reaction mixture with a low molecular weight paraffin, such as pentane, so as to precipitate the novel octachloro octahydro dimethanonaphthalene therefrom. The crude solid that is obtained in this manner can be employed as such for biocidal purposes or it may be further purified by recrystallization, for example from a mixture of isopropyl alcohol and carbon tetrachloride as the solvent.

The following examples illustrate the preparation of the novel compound of this invention. In Example I there is shown chlorination of bicyclo(2.2.1)-2,5-heptadiene using gaseous chlorine as the chlorinating agent. In Examples II and III there is shown use of iodobenzene dichloride and sulfuryl dichloride, respectively, as the chlorinating agent. Example IV illustrates a suitable method for carrying out the Diels-Alder adduction of the dichlorobicycloheptene produced by any of Examples I, II and III with hexachlorocyclopentadiene to produce the novel product of this invention. In the examples the parts are by weight unless otherwise specified.

*Example I*

One hundred parts by weight of bicyclo(2.2.1)-2,5-heptadiene was chilled to 0° C. A stream of gaseous chlorine was passed into the liquid bicyclo(2.2.1)-2,5-heptadiene while maintaining the temperature at about 0° C. until 77 parts of chlorine had been absorbed. About 5½ hours were required. The resulting mixture was slurried with moist $CaCO_3$, filtered and then dried and fractionally distilled. After separating a forerun amounting to about 10% by weight of the reactants there was separated a fraction, boiling between 40° C. and 50° C. under approximately 0.8 millimeter mercury pressure and amounting to 65.7% by weight of the reactants. The content of 6,7-dichlorobicyclo(2.2.1)-2-heptene in this fraction was estimated by hydrogenation to be approximately 55% by weight. The fraction as such is suitable for use in Example IV, or it may be further purified by redistillation.

*Example II*

To 276 parts of bicyclo(2.2.1)-2,5-heptadiene there was added during the course of about 45 minutes about 275 parts of iodobenzene dichloride, with stirring and while holding the temperature of the reaction mixture at 38° to 42° C. by cooling. Unreacted bicyclo(2.2.1)-2,5-heptadiene then was distilled from the mixture at atmospheric pressure. The residual oil was distilled under reduced pressure to obtain a distillate fraction rich in 6,7-dichlorobicyclo(2.2.1)-2-heptane. The following cuts were taken:

| | Parts |
|---|---|
| Forerun, 81 to 97° C./28 mm. Hg (crude iodobenzene) | 206.5 |
| Product cut, 97 to 102° C./30 mm. Hg | 122.5 |
| Undistilled residue | 25.0 |

The product cut was redistilled to yield 87 parts of colorless liquid boiling at 99° C. under 26 millimeters mercury pressure. Analyses: calculated for $C_7H_8Cl_2$, 43.6% Cl; found, 42.7% Cl.

*Example III*

There were mixed 460 parts of bicyclo(2.2.1)-2,5-heptadiene and 2.2 parts of di-tertiary-butylhydroquinone. While the mixture was heated at reflux 11.9 parts of sulfuryl chloride was added over a period of 1.5 hours. A white precipitate formed slowly as the reaction progressed. The mixture was stirred and kept at gentle reflux for about 15 minutes after all of the sulfuryl chloride had been added. The mixture then was filtered to remove the white precipitate (polymer); the precipitate was washed with diethyl ether, and the washings were combined with the filtrate. The combined liquid was decolorized and clarified by treatment with activated carbon and the ether then was evaporated off on a steam bath. The residual oil was distilled to yield 107.3 parts of a colorless oil boiling at 75 to 105° C. under 15 millimeters' mercury pressure. The distillate was redistilled at 15 millimeters' mercury pressure. The following fractions were collected:

| Fraction Number | Boiling Range, ° C. | Amount (parts) |
|---|---|---|
| 1 | 50-57 | 4.9 |
| 2 | 60-88 | 9.8 |
| 3 | 88-91 | 71.3 |
| 4 | 91-95 | 14.1 |
| 5 | undistilled residue | 5.2 |

Fraction No. 3 was analyzed. Calculated for $C_7H_8Cl_2$, 43.6% Cl; found, 43.4% Cl.

*Example IV*

Hexachlorocyclopentadiene and dichlorobicycloheptene prepared as in any of the preceding examples were mixed in about equimolecular proportions and the mixture was heated at 150° C. for 150 hours at atmospheric pressure. Unconsumed reactants then were removed by stripping the crude product up to 155° C. under 2.0 millimeters' mercury pressure. The residue was diluted with pentane to precipitate the crude 1:1 adduct. The yield of the crude product (melting range 149–151° C.) was 29 mole percent based on the amount of hexachlorocyclopentadiene charged. The crude solid was recrystallized from a mixture of isopropyl alcohol and carbon tetrachloride with recovery of about 86% by weight in the form of a white crystalline product melting at 152.5 to 154° C. Analyses: Found 33.3% C, 1.9% H, 65.0% Cl; calculated for $C_{12}H_8Cl_8$; 33.0% C, 1.8% H, 65.2% Cl. Additional amounts of the 1:1 adduct were recoverable from the mother liquors from the pentane precipitation step and from the recrystallization step. A still further quantity of adduct was obtained by heating the distillate recovered upon stripping the reaction mixture of the adduction step at 190–200° C. followed by recovery procedure similar to that used in the isolation of the major portion of the product.

The valuable and unexpected toxicity of the novel product of this invention towards insects and related pests is illustrated by the results of toxicity measurements using the common housefly (*Musca domestica*) as the test insect and the method described by Sun, Y. P., Journal of Economic Entomology, volume 43, page 45 (1950). The toxicity was measured relative to that of the known insecticide alpha-chlordane and is expressed in terms of the relationship between the weight of alpha-chlordane required to produce 50% mortality of the test insects and the weight of the test material required to produce the same mortality of the test insects. Assigning alpha-chlordane arbitrarily a toxicity rating of 100%, the toxicity of the test compound is expressed in terms of toxicity index which gives the percentage activity of the test compound compared to that of alpha-chlordane.

Utilizing the crude solid (melting range 149–151° C.) shown in Example IV, the toxicity index of this material was found to be 217 whereas the toxicity index for the recrystallized material (melting range 152.5–154° C.) was found to be 248. It thus is seen that the new toxicant of this invention is significantly more toxic towards the housefly than is alpha-chlordane and, also, that it can be used effectively either in the purified form or in a less pure state. Reference to the new compound in the claims by its chemical name is not intended to imply that the invention is limited to the new product only in purified form. Tests utilizing other insects than the housefly have shown that the new product of this invention is generally toxic towards other insects and related classes of pests.

The surprisingly low mammalian toxicity of the new product of this invention has been demonstrated by standardized tests utilizing laboratory rats and mice as the test animals. In typical tests solutions of 1,2,3,4,6,9,10,10-octachloro - 1,4,4a,5,6,7,8,8a - octahydro-1,4,5,8-dimethanonaphthalene in peanut oil were administered intraperitoneally to male mice of the Webster strain and male rats of the Long-Evans strain. For the mice, the $LD_{50}$ was found to be approximately 0.9 gm./kg. of body weight. Dosages of 1,2,3,4,6,9,10,10-octachloro-1,4,4a,5,6,7,8,8a-octahydro-1,4,5,8-dimethanonaphthalene as high as 6.4 gms./kg. body weight produced no mortality in the rat. Aldrin, by way of comparison, has been found to have an $LD_{50}$ (intragastric administration) against rats of approximately 0.07 gm./kg. body weight and against the mouse of about 0.04 gm./kg. body weight. The unexpected combination of high insecticidal activity coupled with low mammalian toxicity is one of the most noteworthy characteristics of the new toxicant of this invention.

For controlling insects with the aid of the new product of this invention there may be employed any of the methods customarily employed in the art for application of insecticides to insets and their habitats. The new compound may be employed in the form of a solution in a suitable solvent, such as a light petroleum distillate, a chlorinated solvent or the like. The solution may be applied as such, by spraying or by equivalent means, or it may be dispersed in water with the aid of conventional dispersing or emulsifying agents, to provide a dilute aqueous emulsion which may be applied by spraying, by dipping or equivalent known procedures. The application of the new toxicant may also be carried out by aerosol technique. Insecticidal dusts and wettable powders may me prepared by adsorbing the toxicant upon pulverulent carriers, such as clay, calcium carbonate, silica or the like at concentrations ranging from as little as about 1% to as much as 80% by weight of the total composition, depending upon the intended use and manner of application. The new toxicant of the invention can be employed as the sole toxicant in such compositions or there may be combined with it other, known toxicants among which may be mentioned Aramite, Toxaphene, DDT, dieldrin, aldrin, benzene hexachloride, endrin and the like.

The new insecticidal compositions of the invention can be employed as household insecticides, for horticultural purposes, in animal husbandry, in grasshopper control and in a wide variety of other specific applications which will be immediately apparent to those skilled in the art. Because of its extremely low mammalian toxicity the novel insecticide of this invention appears to be of particular interest for use in the home and in food processing plants or storage facilities. The novel insecticide has been found to be substantially more toxic than DDT to the housefly and as good as, or better than, DDT to the confused flour beetle and granary weevil. The novel insecticide also has been found to have superior utility for protecting fibers, cloth and the like containing wool or other materials that are susceptible to attack by larvae of the webbing clothes moth and black carpet beetle, making it of interest as an impregnant to render cloth and other fibrous materials resistant to attack by these and similar insects.

When the term "insects" is used in the preceding disclosure and in the appended claims, the term is used to include not only the true insects, or members of the class Insecta, but also related or similar non-vertebrate animal organisms belonging to the allied classes of arthropods and including mites, ticks, spiders, lice and the like.

The claimed invention is:

1. As a new chemical compound, 1,2,3,4,6,9,10,10-octachloro - 1,4,4a,5,6,7,8,8a-octahydro - 1,4,5,8 - dimethanonaphthalene having when substantially pure and in crystalline form a melting point of 152.5° C. to 154° C.

2. A pesticidal composition of matter comprising 1,2,3,4,6,9,10,10 - octachloro - 1,4,4a,5,6,7,8,8a - octahydro - 1,4,5,8 - dimethanonaphthalene having when substantially pure and in crystalline form a melting point of 152.5° C. to 154° C., and a pesticide adjuvant therefor.

3. A pesticidal composition of matter comprising 1,2,3,4,6,9,10,10 - octachloro - 1,4,4a,5,6,7,8,8a - octahydro - 1,4,5,8 - dimethanonaphthalene having when substantially pure and in crystalline form a melting point of 152.5° C. to 154° C., and a solvent as a pesticide adjuvant therefor.

4. A pesticidal composition of matter comprising 1,2,3,4,6,9,10,10 - octachloro - 1,4,4a,5,6,7,8,8a - octahydro-1,4,5,8-dimethanonaphthalene having when substantially pure and in crystalline form a melting point of 152.5° C. to 154° C., and a dry pulverulent carrier therefor.

5. A method of controlling insects which comprises subjecting the insects to the toxic action of 1,2,3,4,6,9,10,10 - octachloro - 1,4,4a,5,6,7,8,8a - octahydro - 1,4,5,8-dimethanonaphthalene having when substantially pure and in crystalline form a melting point of 152.5° C. to 154° C.

References Cited in the file of this patent

UNITED STATES PATENTS

| | | |
|---|---|---|
| 2,635,979 | Lidov | Apr. 21, 1953 |
| 2,717,851 | Lidov | Sept. 13, 1955 |